US006964107B1

(12) United States Patent
Ahola

(10) Patent No.: US 6,964,107 B1
(45) Date of Patent: Nov. 15, 2005

(54) SYSTEM, METHOD, DEVICE AND COMPUTER CODE PRODUCT FOR IMPROVING THE READABILITY OF AN ELECTRONIC COMPASS

(75) Inventor: Tom Mikael Ahola, Helsinki (FI)

(73) Assignee: Nokia Corporation, (FI)

( * ) Notice: Subject to any disclaimer, the term of this patent is extended or adjusted under 35 U.S.C. 154(b) by 0 days.

(21) Appl. No.: 10/856,206

(22) Filed: May 27, 2004

(51) Int. Cl.[7] ............................................. G01C 17/38
(52) U.S. Cl. ...................... 33/356; 33/355 R
(58) Field of Search .............. 33/356, 355 R, 33/357, 355 D, 1 E

(56) References Cited

U.S. PATENT DOCUMENTS

| 2,331,617 | A | * | 10/1943 | Moore | ......................... 33/362 |
| 4,292,854 | A | * | 10/1981 | Liebing | ....................... 33/321 |
| 5,170,566 | A | * | 12/1992 | Fowler et al. | ................ 33/356 |
| 5,953,683 | A | * | 9/1999 | Hansen et al. | ............ 33/355 R |
| 6,282,803 | B1 | * | 9/2001 | Dunne | ......................... 33/356 |
| 6,651,003 | B2 | * | 11/2003 | Woloszyk et al. | ........... 33/356 |
| 6,871,410 | B1 | * | 3/2005 | Le Jeune | .................... 33/313 |
| 2005/0044737 | A1 | * | 3/2005 | Choi et al. | ..................... 33/356 |

* cited by examiner

Primary Examiner—Christopher W. Fulton
(74) Attorney, Agent, or Firm—Foley & Lardner

(57) ABSTRACT

A system, method, device and computer code product is disclosed for stabilizing compass heading under tilt error conditions from an uncorrected electronic compass reading. Exemplary embodiments include a stabilizing filter configured to filter out tilt errors incorporated into the uncorrected electronic compass reading and a filter adaptation module configured to control the stabilizing filter response based on the signal radius of the uncorrected compass reading and a pre-calibrated ideal radius for the compass. The filter adaptation module can be configured to calculate a filter response parameter as a function of the relative difference between the signal radius of the uncorrected compass reading and the pre-calibrated ideal radius. The filter response parameter can be passed to the stabilizing filter for controlling its operation.

24 Claims, 7 Drawing Sheets

SYSTEM, METHOD, DEVICE AND COMPUTER CODE PRODUCT FOR IMPROVING THE READABILITY OF AN ELECTRONIC COMPASS

FIELD OF THE INVENTION

The present invention relates generally to the field of electronic compasses. More particularly, the present invention relates to stabilizing filters for improving the readability of an electronic compass.

BACKGROUND INFORMATION

In general, compasses determine geographic orientation with reference to the Earth's magnetic field, which generally runs north and south for most populated parts of the Earth. As the magnetic poles of the Earth are not located in the same position as the Earth's geographic poles, there is an error between the geographic (true) and magnetic (compass) headings, which is called variation. Variation is location and time dependent. Conventional compasses employ a freely movable, magnetically sensitive member which aligns itself with the Earth's magnetic field and points towards the Earth's magnetic north pole.

Electronic compasses, on the other hand, determine geographic orientation without using a magnetically sensitive member. In general, electronic compasses determine geographic orientation by simultaneously measuring the magnitude of the Earth's magnetic field in at least two different directions which are related to each other at a known angle. Because the measurements are dependant upon the orientation of the measuring device, they can be used to determine the deviation of the compass's orientation from magnetic north, which gives the compass heading.

The projections of the Earth's magnetic field to the measurement plane is a function of the tilt angle of the measurement plane. Electronic compasses built around 2-axis sensors can suffer from high sensitivity to tilt errors. If the tilt angle is not kept constant during measurements there can be error. If the compass device is tilted say 10 degrees, a compass reading error of 30 degrees or more is possible.

Sensitivity to tilt differs between different geographical areas but can generally create problems for electronic compasses. High-end compasses sometimes use a tilt sensor to correct tilt errors. As this approach can be cost prohibitive, many low-end electronic compass implementations compensate for tilt error in other ways, such as through the use of a bubble level indicator. When using this type of low-end device, the user is required to keep the compass device accurately leveled during use by using the bubble indicator to manually level the compass.

While the bubble level indicator approach may provide a low cost solution if the user is in a stable environment, it is very difficult to use if the user is walking or otherwise moving. Wobbling causes tilt errors that make the compass reading noisy and difficult to read. In bad cases of wobble, the compass needle can even start spinning around. The inexperienced user judges such a device to be of very low quality.

As such, there is a need for an improved electronic compass that is capable of correcting tilt error problems in a cost effective manner.

SUMMARY OF THE INVENTION

One embodiment of the invention relates to an electronic compass. The compass can include a sensor configured to measure the Earth's magnetic field and to provide sensor output signals indicative of the measured magnetic field, a stabilizing filter configured to filter out random tilt errors incorporated into the sensor output signals, and a filter adaptation module configured to control the stabilizing filter response based on the sensor output signals and pre-calibrated compass radius information. The stabilizing filter further can comprise, for example, a first order infinite input response (IIR) filter. The filter adaptation module may be configured to provide the stabilizing filter with a filter response parameter capable of slowing down the stabilizing filter response so that the compass retains a prior correct compass reading when the compass is subjected to a large tilt error.

Another embodiment of the invention can comprise a device for filtering out random tilt errors in an electronic compass configured to produce an uncorrected compass reading. The device can include a stabilizing filter configured to filter out tilt errors incorporated into the uncorrected compass reading, and a filter adaptation module configured to control the stabilizing filter response based on the uncorrected compass reading and pre-calibrated compass radius information. The filter adaptation module may be configured to provide the stabilizing filter with a filter response parameter for filtering out the tilt error incorporated into the uncorrected compass reading. In one embodiment, the filter adaptation module can be configured to calculate the filter response parameter as a function of the relative difference between a signal radius of the uncorrected compass reading and the pre-calibrated compass radius information.

Still another embodiment of the invention can comprise a method for filtering out random tilt errors in an electronic compass configured to produce an uncorrected compass reading. In one embodiment, the method can include calculating a signal radius of the uncorrected compass reading, calculating a filter response parameter based on the calculated signal radius and a pre-calibrated ideal compass radius, and filtering out tilt error from the uncorrected compass reading based on the calculated filter response parameter. The method can also include determining if the filter response parameter exceeds a predetermined threshold and if so, activating a warning indicator.

A still further embodiment of the invention can include a computer code product for filtering out random tilt errors in an electronic compass configured to produce an uncorrected compass reading. The computer code product can include computer code configured to calculate a signal radius of the uncorrected compass reading, calculate a filter response parameter based on the calculated signal radius and a pre-calibrated ideal compass radius, and filter out tilt errors from the uncorrected compass reading based on the filter response parameter.

Other principle features and advantages of the invention will become apparent to those skilled in the art upon review of the following drawings, the detailed description, and the appended claims.

DETAILED DESCRIPTION OF THE PREFERRED EMBODIMENTS

Embodiments of the current invention generally relate to readability improvements for an electronic compass through the use of a stabilizing filter and a filter adaptation module. Embodiments of the invention are able to inhibit the situation in which the compass direction indicator spins uncontrollably and stabilize the compass heading during random tilt error conditions. The implementation cost of various embodiments of the invention is practically negligible. The embodiments can be used to provide significant added value and quality boost to low end compasses as well as further improve the performance of high-end devices, which may include a tilt sensor.

In one embodiment, to stabilize the compass reading, the stabilizing filter adapts its response to the radius error of the sensor signal. If the error gets larger, the filter response slows down and tries to retain the prior correct compass reading. If the compass wobbles around the horizontally leveled position, the radius error will wobble around the zero error level. With a properly implemented adaptation function, the compass reading will stabilize close to the error-free heading, regardless of the nature or symmetry of the wobble motion. This relieves the user from keeping a constant eye on a bubble level indicator while navigating.

Figure 1:
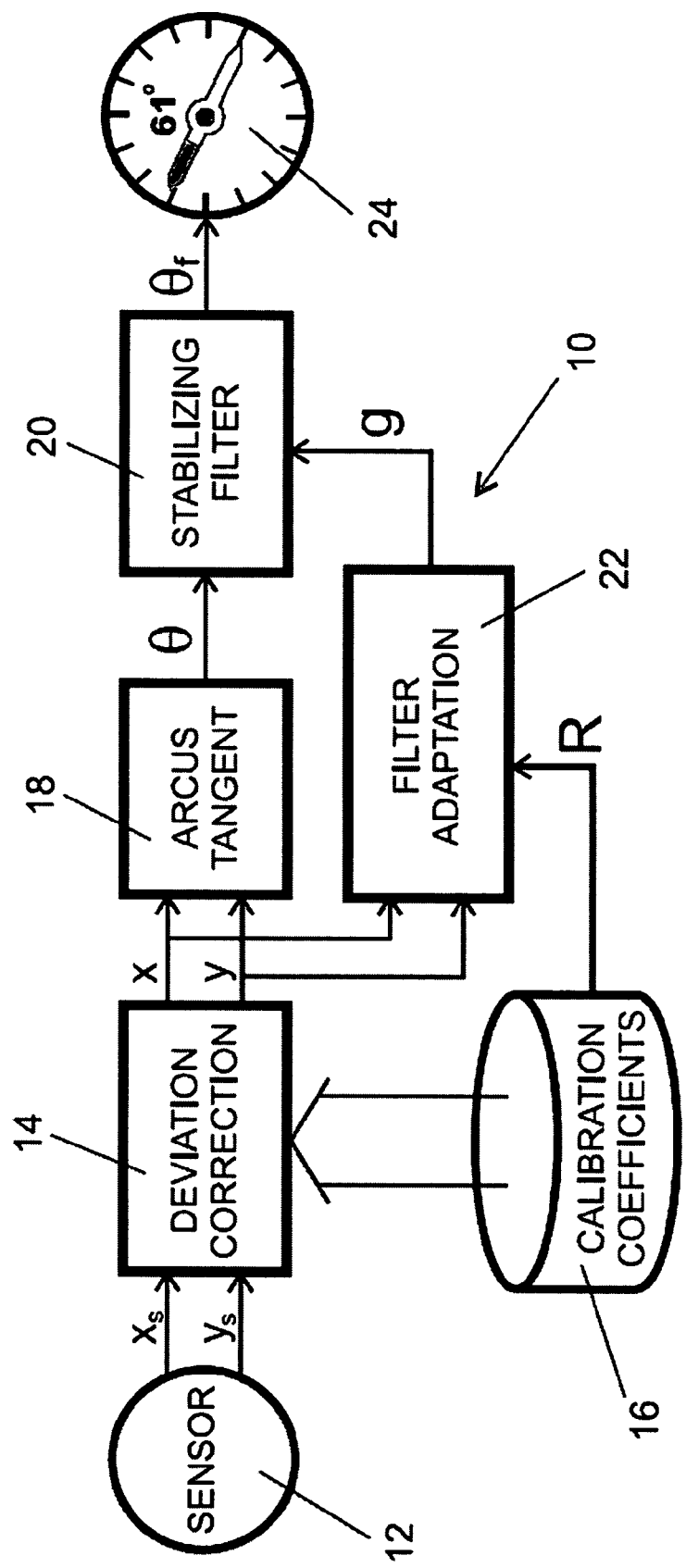
FIG. 1 is a block diagram of one embodiment of a compass device according to the present invention.

Referring to FIG. 1, one embodiment of a 2-axis electronic compass is shown and generally designated by reference numeral 10. The electronic compass 10 includes a sensor 12, a deviation correction module 14, a calibration coefficients registry 16, an arcus tangent module 18, a stabilizing filter 20, a filter adaptation module 22, and a display 24. The sensor 12 is configured to measure the Earth's magnetic field and provide sensor output signals ($x_s$ and $y_s$) that are proportional to magnetic field strength in two orthogonal directions.

The deviation correction module 14 can be configured to correct the sensor outputs for compass deviation errors caused by electrical imperfections and magnetic materials in the device 10. Calibration coefficients used by the deviation correction module 14 can be stored in a calibration coefficients registry 16. The coefficient information stored in the registry 16 can be obtained from a calibration done by the user prior to using the compass 10. The compass heading ($\Theta$) can be computed from the corrected sensor signals (x and y) by the arcus tangent module 18. The arcus tangent module 18 can be configured to use a 4-quadrant arcus-tangent finction to compute the compass heading.

In conventional compasses, the compass heading ($\Theta$) is directly displayed on the display 24. However, embodiments of the present invention apply wobble or tilt error correction prior to displaying the compass heading ($\Theta$). In one embodiment, a stabilizing filter 20 and a filter adaptation module 22 can be incorporated to filter wobble and/or tilt error in the compass heading ($\Theta$) before it is displayed. The stabilizing filter 20 response can be controlled by an adaptation algorithm which is incorporated into the filter adaptation module 22 and configured to monitor the corrected sensor signals (x and y) and read the compass radius (R) from the calibration coefficients registry 16. The filter adaptation module 22 can provide a filter response parameter (g) to the stabilizing filter 20 which is configured to filter out random tilt error from the compass heading ($\Theta$) to produce a filtered compass heading ($\Theta_f$) which can be displayed on display 24. It should be noted that the stabilizing filter 20 and filter adaptation module 22 can comprise stand alone modules or can be combined into a single module either alone or with other modules and/or components.

Figure 2:
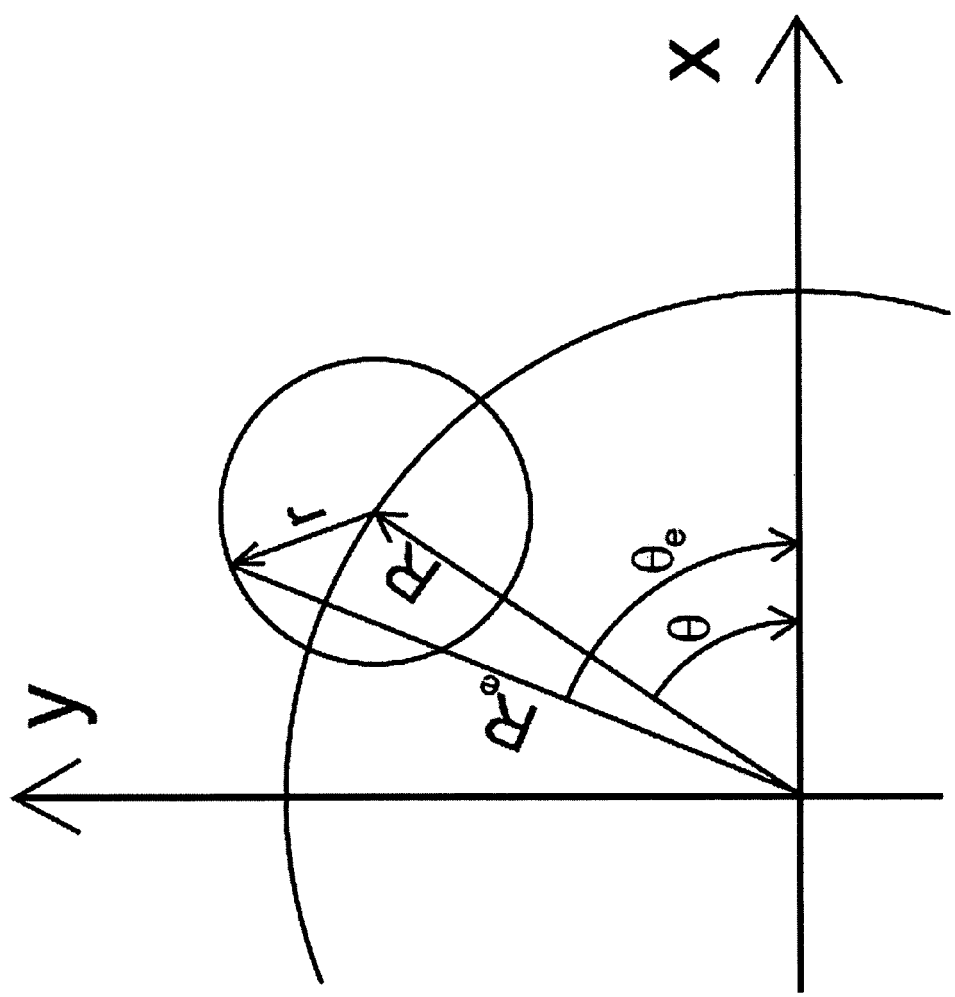
FIG. 2 is a graphical representation illustrating tilt error creating an erroneous compass heading.

Ideally, when the compass device 10 is perfectly horizontally leveled, the corrected sensor signals (x and y) always lie on an origin-centered circle with a radius R in the x-y plane as shown in FIG. 2. The angle $\Theta$ from the origin to the x, y pair is an accurate representation of the compass heading (taking into account that there might be a sign change or a 90 degree offset depending on the orientation of the sensor within the compass device 10). If the compass is tilted, an error in the x, y signal pair can appear. The error magnitude r is proportional to the amount of tilt and the error direction can depend on the tilt direction. The erroneous sensor signal has an erroneous angle $\Theta_e$ and magnitude $R_e$. By observing the radius error $R_e$-R a tilt condition can be detected.

Figure 3:
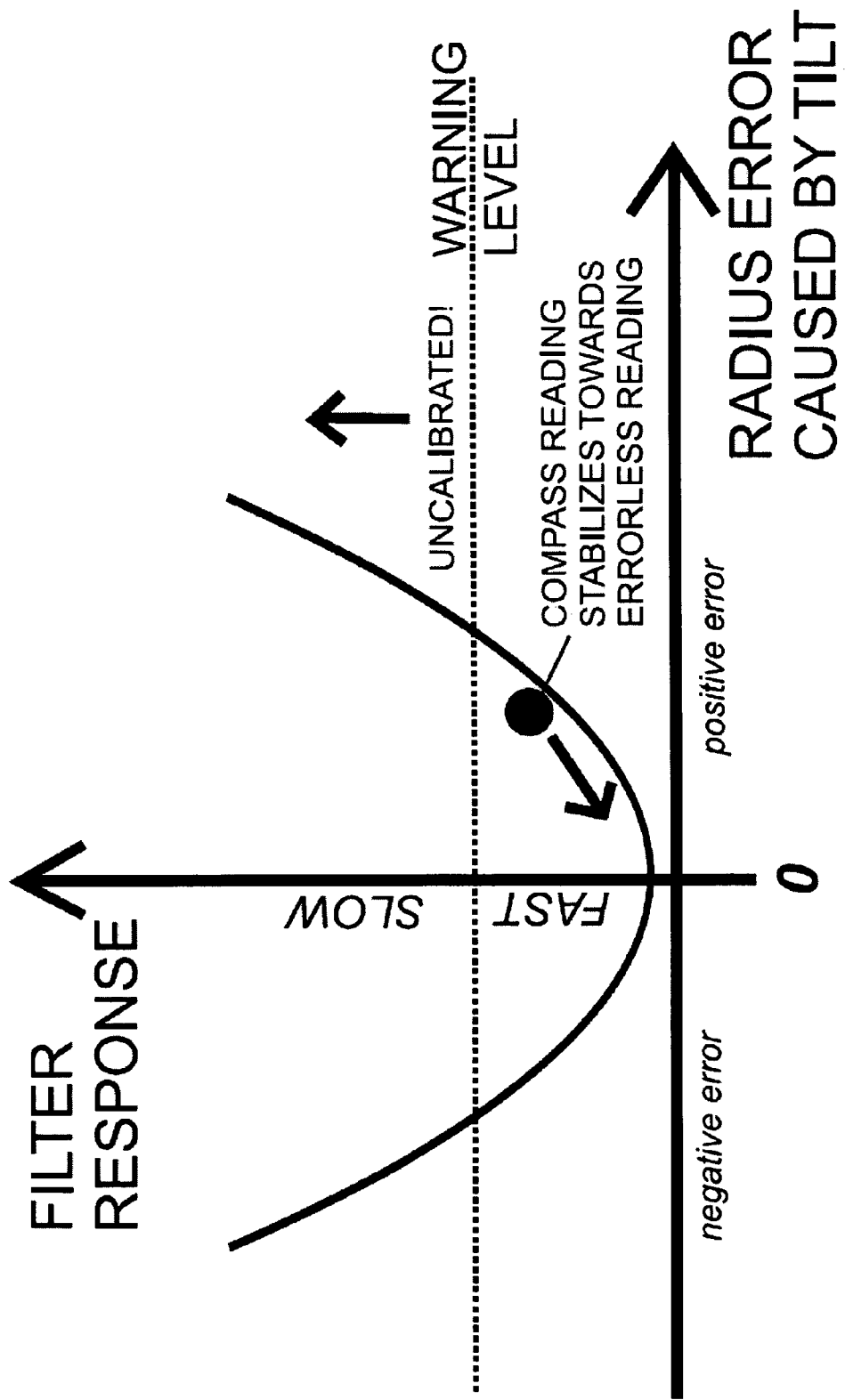
FIG. 3 is a graphical representation of one embodiment of a stabilizing filter response according to the present invention.

To stabilize the compass reading, the stabilizing filter 20 can be configured to adapt its response to the radius error $R_e$-R as shown in FIG. 3. If the error is small and the corrected sensor signals (x and y) lie close to the radius R circle, the filter 20 response can be fast and the compass 10 can track the heading as fast as a conventional implementation. If the error gets larger, the filter 20 response can be slowed down so that the compass 10 retains the prior correct compass reading. If the compass 10 wobbles around the horizontally leveled position, the radius error may wobble around the zero error level. Thus, as mentioned above, with a properly designed adaptation function, the compass reading can be stabilized close to the error-free heading, regardless of the nature or symmetry of the wobble motion.

In one embodiment, a warning indication can be generated if the error exceeds a predefined level to alert the user of uncalibrated operation. This warning indication can be configured to report not only tilt errors but also errors caused by system drifts or an invalid calibration for the current geographic location. The user can correct errors, other than tilt errors, by doing a new calibration of the device 10.

Figure 4:
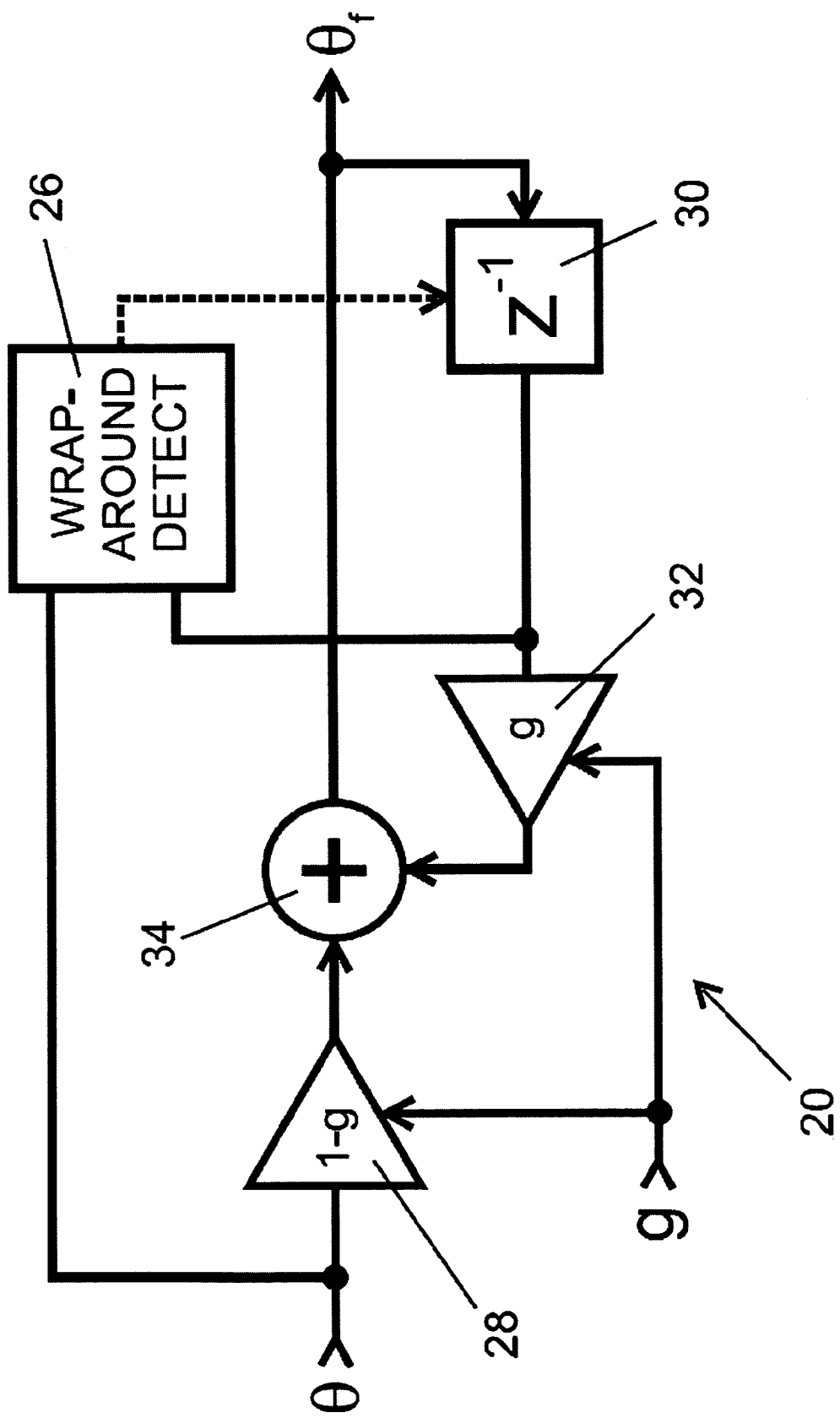
FIG. 4 is a block diagram of one embodiment of a stabilizing filter according to the present invention.

One embodiment of a stabilizing filter 20 according to the present invention is illustrated in FIG. 4. In this embodiment, the stabilizing filter 20 is a simple first order Infinite Input Response (IIR) filter. The parameter g can be used to determine the filter response. One valid range for g is [0, 1]. When the value of g is small, the compass response can be fast. When the value of g increases, especially as it approaches 1, the compass response can become slow. When g=1, the filter output can be latched.

A wrap-around detect module 26 can be included to compensate for wrap-around of the angular signal. The filter delay element 30 value can be compared to the input value and if the difference is greater than half a turn (180 degrees) the value stored in the delay element 30 can be incremented or decremented by 360 degrees so that the difference stays below half a turn.

As can be seen in FIG. 4, the compass heading (Θ) is input into the filter 20 and multiplied by (1-g) in component 28 where g is the filter response parameter. A delay element output created by component 30 can be multiplied by the filter response parameter (g) by component 32 and the result can be summed with the output of component 28 by element 34 resulting in the filtered compass heading (Θ_f).

Figure 5:
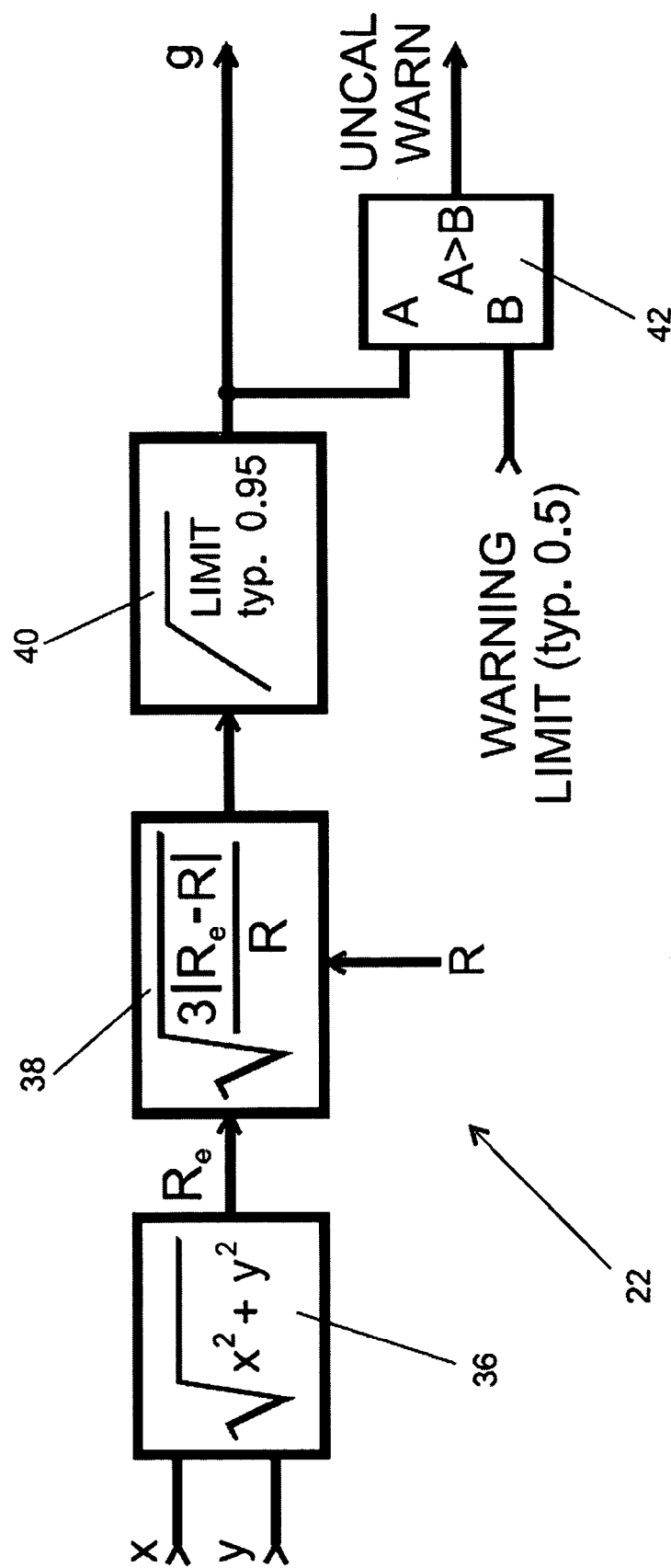
FIG. 5 is a block diagram of one embodiment of a filter adaptation module according to the present invention.

One embodiment of a filter adaptation module 22 according to the present invention is illustrated in FIG. 5. As shown in FIG. 5, the corrected sensor signal (x and y) can be used to calculate the signal radius $R_e$. Component 36 can be configured to calculate the signal radius $R_e$ by taking the square root of the sum of the squares of the corrected sensor signal values. Component 38 can calculate the filter parameter g as a function of the relative difference between $R_e$ and R by component 38 using the equation:

$$\sqrt{\left|\frac{3|R_6 - R|}{R}\right|}$$

The resulting filter parameter value can be limited to a maximum value (e.g. 0.95) by component 40. The limiting can be used to avoid a seemingly stuck compass reading that might confuse the user. The radius R (corresponding to the ideal case sensor signal radius) can be obtained from compass calibration and stored in the calibration coefficients registry. Comparator 42 can be used to activate a warning indicator when the g parameter exceeds a predefined limit. This warning can be configured to be informative only so that it does not inhibit or block compass readouts.

Figure 6:
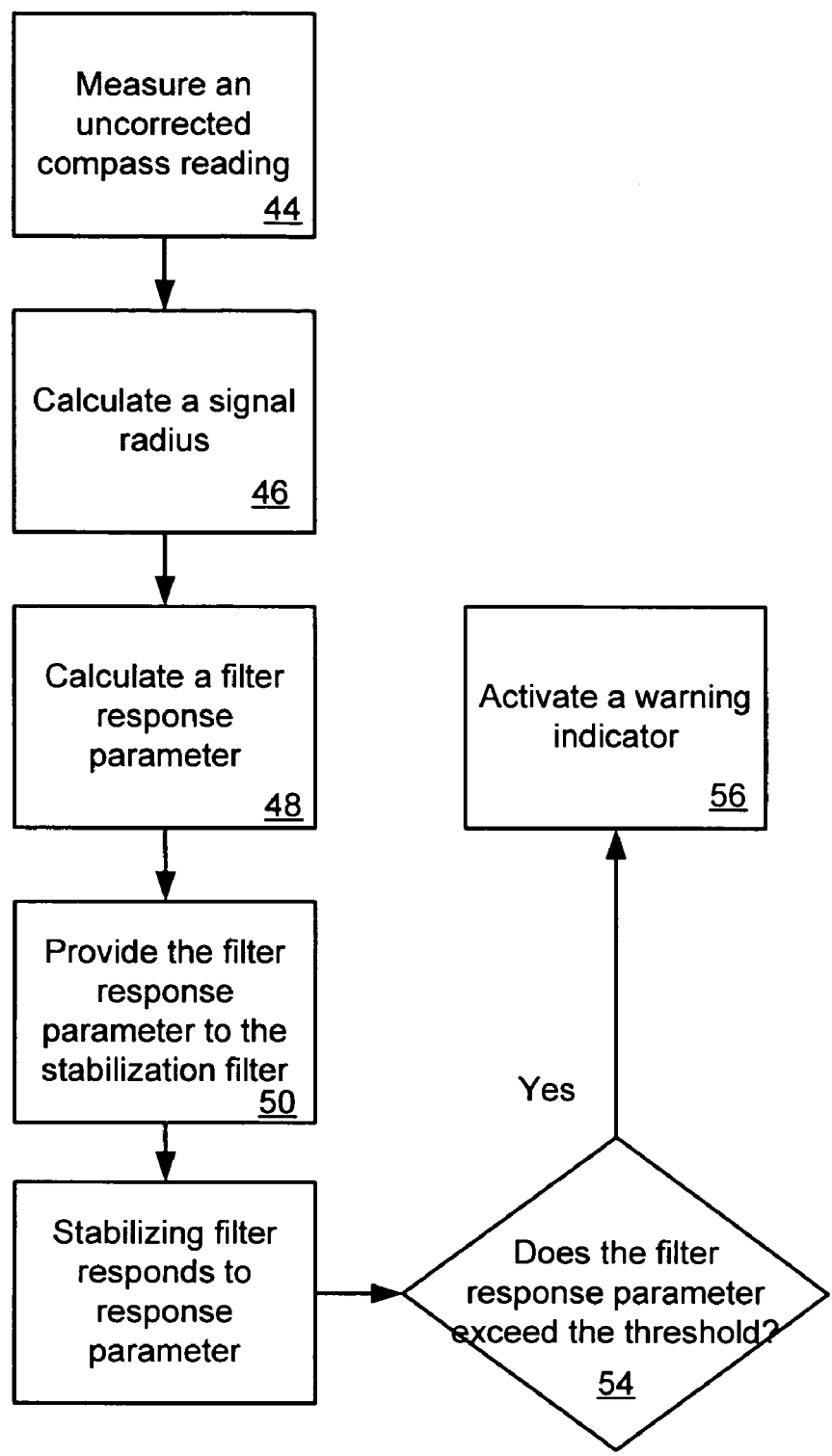
FIG. 6 is a flow chart illustrating one embodiment of a method for filtering out tilt error in an electronic compass according to the present invention.

FIG. 6 illustrates one embodiment of a method for filtering random tilt errors according to the present invention. The method includes measuring an uncorrected compass reading in operation 44. Calculating a signal radius based on the uncorrected compass reading in operation 46. Calculating a filter response parameter, in operation 48, based on the signal radius and pre-calibration compass radius information and providing the filter response parameter to the stabilizing filter in operation 50. In operation 52, the stabilizing filter can respond to the filter response parameter to filter random tilt error. Operation 54 compares the filter response parameter to a predetermined threshold and if the filter response parameter exceeds the predetermined threshold, a warning indication is generated in operation 56.

Figure 7:
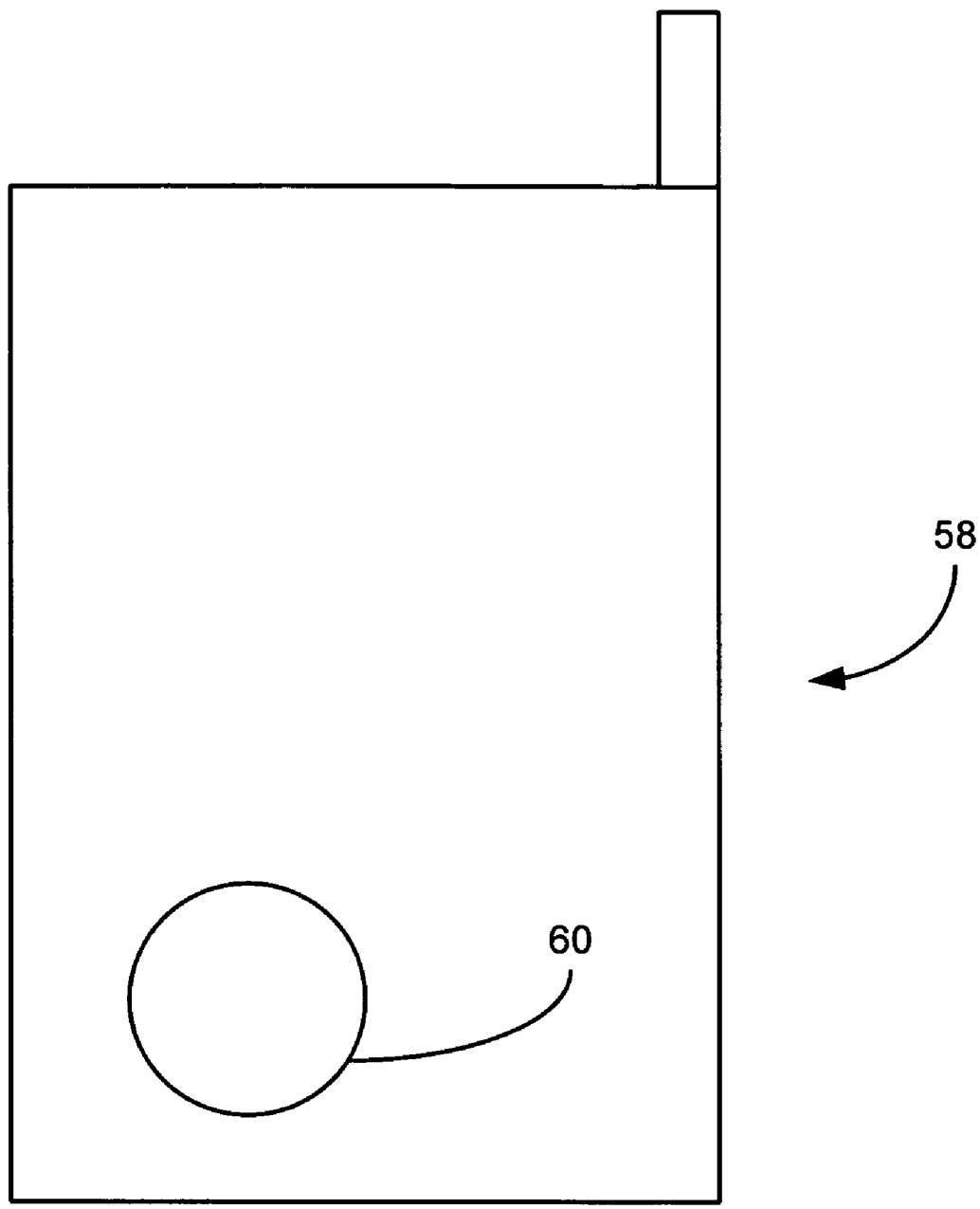
FIG. 7 is a block diagram of one embodiment of a mobile electronic device incorporating an electronic compass according to the present invention.

Electronic compasses of the type described herein can comprise stand-alone compasses or can be incorporated into other devices, such as mobile electronic devices. FIG. 7 illustrates one embodiment of a mobile electronic device 58 including an electronic compass 60 with tilt error filtering according to the present invention. In this embodiment, the mobile electronic device 58 comprises a mobile telephone, however other mobile electronic devices, such as personal digital assistants, laptop computers, etc., can also incorporate an electronic compass.

The systems, devices and methods of the exemplary embodiments of the invention may be implemented as software or hardware in a conventional electronic compass. The implementation cost of the various embodiments are practically negligible especially if implemented in software. As such, embodiments of the invention provide a cost effect solution for improving tilt error tolerance in electronic compasses.

It should be understood that the invention is not confined to the particular embodiments set forth herein as illustrative, but embraces all such modifications, combinations, and permutations as come within the scope of the appended claims. The present invention is not limited to a particular operating environment. Those skilled in the art will recognize that the systems, methods, devices, and computer code products of the present invention may be advantageously operated on different platforms. Thus, the description of the exemplary embodiments is for purposes of illustration and not limitation.

What is claimed is:

1. An electronic compass configured to provide a compass heading based on the Earth's magnetic field, the compass comprising:
   a sensor configured to measure the Earth's magnetic field and to provide sensor outputs signals indicative of the measured magnetic field;
   a stabilizing filter configured to stabilize the compass heading in random tilt error conditions; and
   a filter adaptation module configured to control the stabilizing filter response based on the sensor output signals and pre-calibrated compass radius information.

2. The compass of claim 1, wherein the stabilizing filter further comprises a first order infinite input response (IIR) filter.

3. The compass of claim 1, wherein the filter adaptation module is configured to provide the stabilizing filter with a filter response parameter.

4. The compass of claim 1, further comprising a warning indicator configured produce a warning signal if tilt error exceeds a predetermined threshold.

5. The compass of claim 1, wherein the stabilizing filter response is slowed down as tilt error increases.

6. A device for stabilizing a compass heading display in random tilt error conditions in an electronic compass configured to measure the Earth's magnetic field and produce an uncorrected compass reading based on the measured field, the device comprising:
   a stabilizing filter configured to filter random tilt error incorporated into the uncorrected compass reading; and
   a filter adaptation module configured to control the stabilizing filter response based on the uncorrected compass reading and pre-calibrated compass radius information.

7. The device of claim 6, wherein the stabilizing filter further comprises a first order infinite response (IIR) filter.

8. The device of claim 6, wherein the filter adaptation module is configured to provide the stabilizing filter with a filter response parameter.

9. The device of claim 8, wherein the filter adaptation module is configured to calculate the filter response parameter as a function of the relative difference between a signal radius of the uncorrected compass reading and the pre-calibrated compass radius information.

10. The device of claim 9, wherein the filter adaptation module calculates the filter response parameter as follows:

$$\sqrt{\frac{3|R_6 - R|}{R}}$$

wherein $R_e$ is the signal radius of the uncorrected compass reading and R is the pre-calibrated compass radius information.

11. The device of claim 6, further comprising warning indicator configured for producing a warning signal if the tilt error exceed a predetermined threshold.

12. The device of claim 6, wherein the stabilizing filter response is slowed down as tilt error increases.

13. A method for filtering out tilt error in an electronic compass configured to produce an uncorrected compass reading indicative of compass heading, the method comprising:
- calculating a signal radius of the uncorrected compass reading;
- calculating a filter response parameter based on the calculated signal radius and a pre-calibrated ideal compass radius; and
- stabilizing the compass reading in tilt error conditions with a stabilizing filter based on the calculated filter response parameter.

14. The method of claim 13, further comprising determining if the filter response parameter exceed a predetermined threshold and if so, activating a warning indicator.

15. The method of claim 13, wherein the filter response parameter is further calculated as a function of the relative difference between the signal radius and the pre-calibrated ideal compass radius.

16. The method of claim 15, wherein the filter response parameter is further calculated as:

$$\sqrt{\frac{3|R_6 - R|}{R}}$$

where $R_e$ is the signal radius and R is the pre-calibrated ideal compass radius.

17. A computer code product for filtering out tilt error in an electronic compass configured to produce an uncorrected compass reading indicative of compass heading, the computer code product comprising:
- computer code configured to:
  - calculate a signal radius of the uncorrected compass reading;
  - calculate a filter response parameter based on the calculated signal radius and a pre-calibrated ideal compass radius; and
  - stabilize the compass reading in tilt error conditions based on the filter response parameter.

18. The computer code product of claim 17 further comprising computer code configured to determine if the filter response parameter exceeds a predetermined threshold, and if so, to activate a warning indicator.

19. The computer code product of claim 17, wherein the computer code configured to calculate the filter response parameter is further configured to calculate the filter response parameter as a function of the relative difference between the signal radius and the pre-calibrated ideal compass radius.

20. The computer code product of claim 19, wherein the computer code product is further configured to calculate the filter response parameter as:

$$\sqrt{\frac{3|R_6 - R|}{R}}$$

where $R_e$ is the signal radius and R is the pre-calibrated ideal compass radius.

21. A mobile electronic device, the device comprising:
- an electronic compass configured to measure the Earth's magnetic field and produce an uncorrected compass reading based on the measured field;
- a stabilizing filter configured to filter random tilt error incorporated into the uncorrected compass reading; and
- a filter adaptation module configured to control the stabilizing filter response based on the uncorrected compass reading and pre-calibrated compass radius information.

22. The device of claim 21, wherein the device further comprises a mobile telephone.

23. The device of claim 21, wherein the device further comprises a personal digital assistant.

24. The device of claim 21, wherein the device further comprises a portable computer.

* * * * *